(12) United States Patent
Thompson et al.

(10) Patent No.: US 8,234,010 B2
(45) Date of Patent: Jul. 31, 2012

(54) TETHERED ROBOT POSITIONING

(75) Inventors: Jeffrey S. Thompson, Catawba, SC (US); Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 94 days.

(21) Appl. No.: 12/706,173

(22) Filed: Feb. 16, 2010

(65) Prior Publication Data
US 2011/0202224 A1   Aug. 18, 2011

(51) Int. Cl.
*G05D 1/00* (2006.01)
*B25J 5/00* (2006.01)

(52) U.S. Cl. ..... 700/258; 700/248; 701/23; 318/568.16; 901/46

(58) Field of Classification Search ..... 701/26; 119/780; 180/9.42; 901/4
See application file for complete search history.

(56) References Cited

U.S. PATENT DOCUMENTS

| | | | |
|---|---|---|---|
| 2,259,193 A | 10/1941 | Andrew | |
| 2,796,944 A | 6/1957 | Clement, Jr. | |
| 3,627,071 A | 12/1971 | Haupt | |
| 3,731,756 A | 5/1973 | Hajec | |
| 3,744,223 A | 7/1973 | Jensen | |
| 3,989,116 A | 11/1976 | Hirano | |
| 4,615,406 A | 10/1986 | Bottenschein et al. | |
| 4,967,862 A | 11/1990 | Pong et al. | |
| 5,534,762 A | 7/1996 | Kim | |
| 6,221,256 B1 * | 4/2001 | Kimura | 210/747.6 |
| 7,113,847 B2 * | 9/2006 | Chmura et al. | 700/245 |
| 7,155,309 B2 * | 12/2006 | Peless et al. | 700/245 |
| 7,255,192 B2 | 8/2007 | Perrin et al. | |
| 7,331,436 B1 * | 2/2008 | Pack et al. | 191/12.2 A |
| 7,412,748 B2 | 8/2008 | Lee et al. | |
| 7,424,766 B2 * | 9/2008 | Reindle et al. | 15/319 |
| 7,818,090 B2 * | 10/2010 | Okamoto | 700/253 |
| 7,861,810 B2 * | 1/2011 | Matsukuma | 180/19.3 |

(Continued)

FOREIGN PATENT DOCUMENTS
JP  H06-105938  * 12/1994

OTHER PUBLICATIONS

"Autonomous Solutions Inc. enters mining industry", Oct. 21, 2008, Autonomous Solutions News, pp. 1 http://autonomoussolutions.com/news/news.php.

(Continued)

*Primary Examiner* — Thomas G. Black
*Assistant Examiner* — Lin B Olsen
(74) *Attorney, Agent, or Firm* — Yee & Associates, P.C.; Jeremy J. Westlake

(57) ABSTRACT

A system and method for positioning a mobile machine, such as a robot, using a tether line connected between two mobile machines. A first mobile machine, such as a boundary vehicle, is controlled to move along a path, such as a boundary defining an area. The first machine employs a localization device to determine and maintain its position on the path. A tether line is connected between the boundary vehicle and a second mobile machine, such as a roving vehicle. The first machine determines the position of the second machine relative to the first machine from a length of extension and angle of the tether line. The first machine controls movement of the second machine to perform a task or mission, such as a task performed in the area defined by the boundary.

35 Claims, 5 Drawing Sheets

U.S. PATENT DOCUMENTS

2002/0095239 A1* 7/2002 Wallach et al. ............... 700/245
2002/0174506 A1* 11/2002 Wallach et al. ................. 15/319
2005/0004708 A1* 1/2005 Goldenberg et al. ......... 700/245
2006/0290779 A1* 12/2006 Reverte et al. .................. 348/84
2008/0188982 A1* 8/2008 Imus et al. .................... 700/245
2009/0216444 A1* 8/2009 Crowell ....................... 701/213
2011/0093170 A1 4/2011 Yuet et al.

OTHER PUBLICATIONS

U.S. Appl. No. 12/706,155, filed Feb. 16, 2010, Teague et al.

* cited by examiner

TETHERED ROBOT POSITIONING

FIELD OF THE INVENTION

The present invention relates generally to autonomous mobile machines, such as autonomous mobile robots, and more particularly to systems and methods for detecting and controlling the position of an autonomous mobile machine on a surface while performing a task.

BACKGROUND OF THE INVENTION

Robots include mobile teleoperated, supervised, and fully autonomous mobile machines of all sizes. Such mobile robots are used to perform a variety of tasks. For example, smaller mobile robots of this type may be used for a variety of purposes around the home or office, such as for delivering mail, mowing the lawn, and vacuuming floors.

Basic mobile robots typically include a means of locomotion and power, a task payload, a control system including a path definition, and means of perception for localization and safeguarding. For example, robot locomotion and power may be provided by an electric motor or engine and means for coupling the motor or engine to wheels, tracks, or legs to propel the robot across a surface.

A robot task payload defines the main useful function of the robot. For example, the task payload may include mower blades or a vacuum. Power for the task payload may be provided by the same motor or engine used to propel the robot, or from another source of power.

A robot control system controls the direction and speed of movement of the robot through a defined path. The control system may also control operation of the robot task payload. The control system may be implemented using programmable components and may operate with minimal or no human intervention.

A robot may be controlled to traverse a path by moving between defined points, or to traverse a defined area by using either precise localization or following a random pattern. In order to follow a defined path, the robot controller may receive input from a means of perception for localization, so that the location of the robot with respect to the defined path may be determined. Means of perception for localization may include, for example, means for detecting a wire, marking, or signal that defines the path to be followed, optical or other means for detecting placed or natural landmarks having known positions and from which the robot location may be determined by triangulation, and/or localization means making use of the Global Positioning System (GPS).

A mobile robot typically also employs a means of perception for safeguarding, to prevent damage to the robot and to objects in the robot's environment. Such means of perception for safeguarding may include optical, sonic, and/or physical contact sensors that provide signals to the robot controller from which the presence of potentially damaging situations may be detected. The robot controller may stop the robot, or alter its direction and/or speed of movement, in response to the detection of a potentially damaging situation.

SUMMARY

Tethered positioning for mobile machines, such as robots, is disclosed.

In accordance with an illustrative embodiment, a mobile machine, such as a robot, includes a localization detection device, an extendable tether line, and a controller coupled to the localization detection device. The controller is configured to control automatically movement of the machine along a defined path and to control movement of a second machine attached to a distal end of the tether line. Movement of the second machine is dependent upon a position of the mobile machine, but independent of the defined path of the mobile machine. In other words, the controlled path of the second machine may be different from that of the mobile machine, such that the second machine does not merely follow the path of the mobile machine.

In accordance with an illustrative embodiment, the mobile machine, such as a robot, includes a body, movable ground engaging structures, such as wheels, tracks, or legs, and a motor coupled to the movable ground engaging structures to drive the movable ground engaging structures to move the machine. A line extension monitoring device may be configured to monitor a length of extension of the tether line. A line angle monitoring device may be configured to monitor an angle of the tether line. The controller may be connected to the line extension monitoring device and to the line angle monitoring device and configured to determine a relative position of the second mobile machine attached at a distal end of the tether line from the monitored length of extension and monitored angle of the tether line.

A method of controlling a mobile machine in accordance with an illustrative embodiment includes providing a first mobile machine, detecting by the first mobile machine a position of the first mobile machine along a path, automatically moving the first mobile machine along the path, determining by the first mobile machine a position of a second mobile machine relative to the first mobile machine, and controlling automatically movement of the second mobile machine by the first mobile machine. The controlled movement of the second mobile machine is dependent upon the position of the first mobile machine along the path, but independent of the movement of the first mobile machine along the path.

A system for positioning a mobile machine in accordance with an illustrative embodiment includes a first mobile machine and a second mobile machine. The first mobile machine includes a localization detection device for detecting a position of the first mobile machine along a path. A tether line is extendable from the first mobile machine and under tension. A line extension monitoring device is configured to monitor a length of extension of the tether line. A line angle monitoring device is configured to monitor an angle of the tether line. The second mobile machine is attached at the distal end of the tether line. A first controller is connected to the localization detection device, to the line extension monitoring device, and to the line angle monitoring device and is configured to control automatically movement of the first mobile machine along a defined path, to determine a relative position of the second mobile machine from the monitored length of extension and monitored angle of the tether line, and to generate movement control signals to control movement of the second mobile machine. A transmitter is configured to transmit the movement control signals from the first mobile machine to the second mobile machine. A receiver is configured to receive the movement control signals at the second mobile machine. A second controller on the second mobile machine is configured to control a position of the second mobile machine in response to the movement control signals received from the first mobile machine.

A mobile machine in accordance with another embodiment includes a receiver configured to receive control signals from a master mobile machine connected to the mobile machine by a tether line. The control signals are adapted to control movement of the mobile machine dependent upon a location of the master mobile machine but independent of a path of movement of the master mobile machine. A controller is coupled to the receiver and configured to control movement of the mobile machine in response to the control signals.

A method of controlling a mobile machine in accordance with another embodiment includes receiving first and second control signals from a master mobile machine connected by a tether line to the mobile machine. The first control signals are adapted to control movement of the mobile machine through a first portion of a defined area relative to a first location of the master mobile machine. The second control signals are adapted to control movement of the mobile machine through a second portion of the defined area relative to a second location of the master mobile machine. The controlled movement of the mobile machine is dependent upon the location of the master mobile machine, but independent of a path taken by the master mobile machine between the first location and the second location.

Features, functions, and advantages of the illustrative embodiments can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of illustrative embodiments of the present invention when read in conjunction with the accompanying drawings, wherein:

DESCRIPTION OF THE PREFERRED EMBODIMENT

A system and method for accurately controlling the position of an autonomous mobile robot in order to effectively and efficiently traverse an area while performing a mission task is disclosed. Tethered robot positioning in accordance with illustrative embodiments will be presented herein with reference to robots or other autonomous or semi-autonomous mobile vehicles and other machines that are used to perform various yard care related tasks. However, illustrative embodiments are not limited to the applications described by example herein. A tethered robot positioning system and method in accordance with an illustrative embodiment may be used in a variety of applications to guide robots and other mobile machines of any size that are used for any purpose. For example, in addition to yard work machines, a tethered robot positioning system and method in accordance with an illustrative embodiment may be used to guide robots and other mobile machines used for a variety of applications, including toys, machines used for military, law enforcement, and civilian applications, and large or small mobile robotic vehicles and equipment used in research, education, hauling, demolition, construction, manufacturing, farming, forestry, and mining operations and the like.

The different illustrative embodiments recognize and take into account a number of different considerations. For example, the different illustrative embodiments recognize and take into account that in order for a mobile robot to traverse an area to perform a task effectively, some method for determining accurately the position of the robot in the area at any point in time must be provided. Conventional methods for mobile robot localization and positioning may employ navigation beacons, radio frequency distance measurements, use of the global positioning system (GPS), video object recognition, or other relatively complex systems and methods that can be expensive to implement and maintain and that can be sensitive to environmental conditions.

The different illustrative embodiments also recognize and take into account that where a mobile robot is to perform a task that requires the robot to traverse completely an area, such as a robot lawn mower that must traverse a lawn, complete coverage of the area by the robot with minimal path overlap is desired. For example, for a robot lawn mower, it is preferable that the mower traverse an entire lawn area completely and with minimal repetition of any portion of the mower path, thereby minimizing mowing the same area more than once. By minimizing path overlap, the task can be completely by the robot more quickly, efficiently, and effectively.

Figure 1:
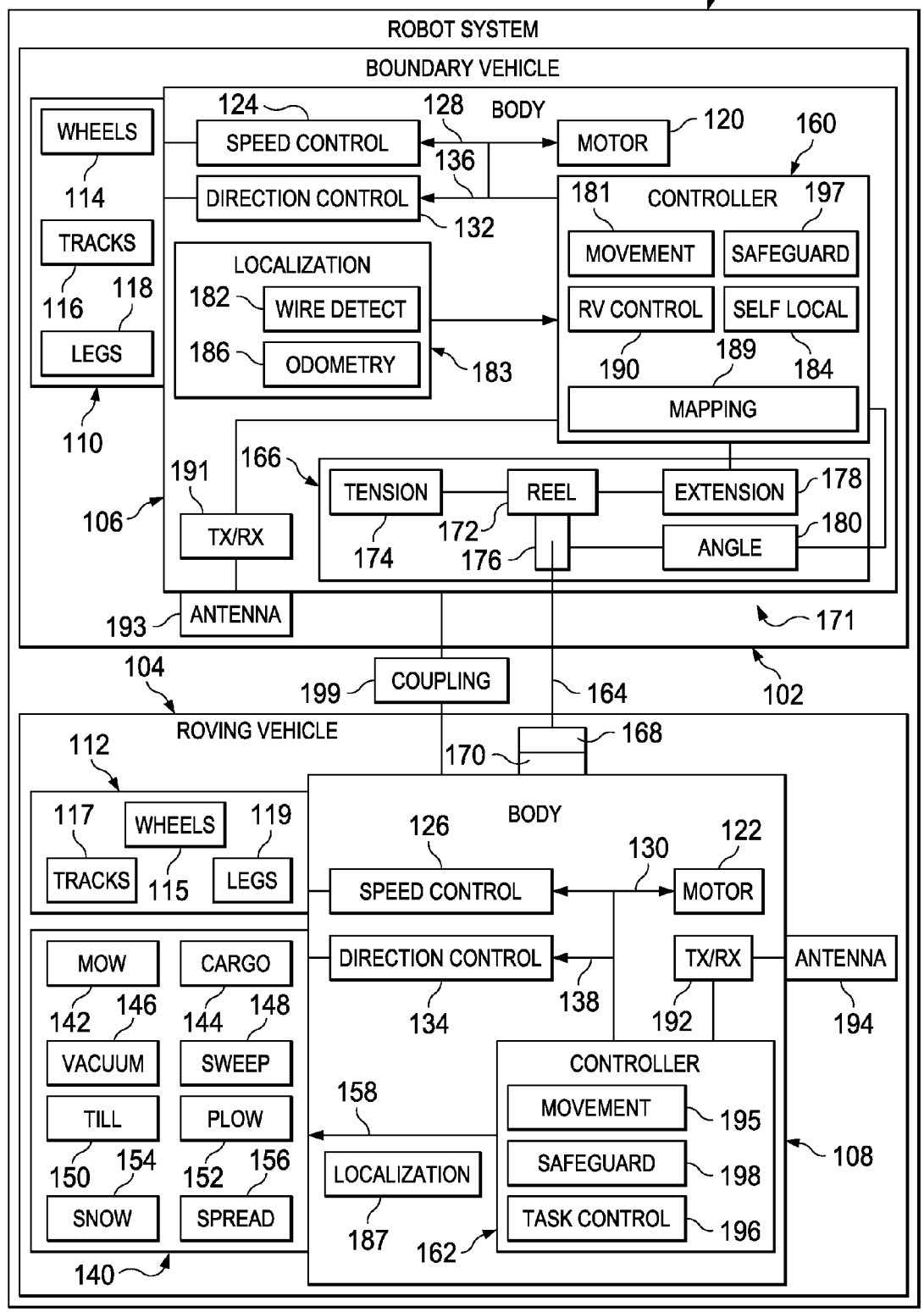
FIG. 1 is a block diagram of functional components of a boundary vehicle and a roving vehicle employing tethered positioning in accordance with an illustrative embodiment.

Structural and functional components of robot system 100 incorporating tethered positioning in accordance with an illustrative embodiment are illustrated in block diagram form in FIG. 1. In this example, robot system 100 may be an automated robot system used for yard work or some other purpose. In accordance with an illustrative embodiment, robot system 100 includes two vehicles, first vehicle 102 and second vehicle 104. First vehicle 102 also may be referred to herein as boundary vehicle 102, or navigation vehicle 102, or, more generically, first machine 102 or master machine or master mobile machine 102. Second vehicle 104 also may be referred to herein as roving vehicle 104 or task vehicle 104, or, more generically, second machine or second mobile machine 104.

As will be described in more detail below, in accordance with an illustrative embodiment, both vehicles 102 and 104 are mobile machines or robots. Boundary vehicle 102 traverses a defined boundary path around a defined area in which roving vehicle 104 is to perform a mission task. Boundary vehicle 102 employs tethered positioning in accordance with an illustrative embodiment to control accurately the position of roving vehicle 104 in the defined area as it performs its mission task. The controlled path of movement of roving vehicle 104 is relative to or dependent upon a position of boundary vehicle 102, but independent of the path of movement of boundary vehicle 102. In other words, the controlled path of movement of roving vehicle 104 may be different from the path of movement of boundary vehicle 102, such that roving vehicle 104 is not limited to following the path of movement of boundary vehicle 102. Boundary vehicle 102 and roving vehicle 104 also may be used in combination to create an accurate map of the defined area, including the location of any obstacles therein, in order to derive a mission plan so that roving vehicle 104 can be controlled to provide complete coverage of the defined area to perform the mission task with minimal path overlap.

Boundary vehicle 102 includes frame or body 106. Roving vehicle 104 includes frame or body 108. Movable ground engaging structures 110 are attached to body 106 of boundary vehicle 102. Moveable ground engaging structures 112 are attached to body 108 of roving vehicle 104. Examples of moveable ground engaging structures 110 and 112 include conventional wheels 114 and 115, continuous and/or segmented tracks 116 and 117, and mechanical legs 118 and 119. Any desired number of moveable ground engaging structures 110 and 112 of any desired type, or multiple types, may be employed to support body 106 or 108, respectively, depending, for example, on the size, weight, operating environment, and/or application of boundary vehicle 102 and roving vehicle 104.

Motor 120 mounted on body 106 of boundary vehicle 102 is coupled to movable ground engaging structures 110 to impart motion to movable ground engaging structures 110, thereby to propel boundary vehicle 102 across the ground. Similarly, motor 122 mounted on body 108 of roving vehicle 104 is coupled to movable ground engaging structures 112 to impart motion to movable ground engaging structures 112, thereby to propel roving vehicle 104 across the ground. Motors 120 and 122 may be coupled to impart motion to one, some, or all of ground engaging structures 110 and 112, respectively. Motors 120 and 122 may include any type of machine used to provide mechanical motion. Motors 120 and 122 may include, for example, electric motors, gasoline engines, diesel engines, or hybrid electric motors. Motors 120 and 122 may comprise one or more conventional individual motors and/or engines of different or the same types. Motor 120 on boundary vehicle 102 may be implemented in the same or different manner from motor 122 on roving vehicle 104. The number, size, and/or type of machines used to implement motors 120 and 122 will depend upon such factors as the size, weight, operating environment, and functionality of boundary vehicle 102 and roving vehicle 104, respectively.

Motors 120 and 122 preferably are coupled to one or more movable ground engaging structures 110 and 112 via speed control mechanisms 124 and 126, respectively. For example, speed control mechanisms 124 and 126 may include one or more sets of gears for coupling mechanical motion from motors 120 and 122 to one or more movable ground engaging structures 110 and 112, respectively. By engaging and disengaging gears in a known manner, the speed at which movable ground engaging structures 110 or 112 are moved by motor 120 or 122, and thus the movement speed of boundary vehicle 102 or roving vehicle 104, may be adjusted. Speed control 124 and 126 may provide for a plurality of forward or forward and reverse movement speeds. This may be achieved, for example, by engaging different sets of gears to achieve different speeds in a conventional manner. Alternatively, speed control 124 and 126 may be provided by controlling the speed of a variable speed motor 120 or 122 connected more directly to movable ground engaging structures 110 or 112. Different individual ones and/or sub-sets of movable ground engaging structures 110 or 112 may be provided with separately adjustable speed control mechanisms 124 or 126, respectively, such that different individual ones and/or subsets of moveable ground engaging structures 110 or 112 may be operated simultaneously at different speeds and/or in different directions.

In accordance with an illustrative embodiment, speed control mechanisms 124 and 126 preferably are configured to control the speed of movement of boundary vehicle 102 and roving vehicle 104 in response to one or more speed control signals 128 or 130, respectively. For example, speed control mechanisms 124 and 126 may include solenoids or other electro-mechanical devices operable in response to speed control signals 128 and 130 to adjust the speed of boundary vehicle 102 or roving vehicle 104 by, for example, changing the engagement of selected gears in response to speed control signals 128 and 130, respectively. Alternatively, speed control signals 128 and 130 may be used to control the speed of variable speed motor 120 or 122, where variable speed motor 120 or 122 is used to drive movable ground engaging structures 110 and 112, respectively.

Direction control mechanisms 132 and 134 are configured in accordance with an illustrative embodiment to change a direction of movement of boundary vehicle 102 and roving vehicle 104 in response to one or more direction control signals 136 and 138, respectively. Direction control mechanisms 132 and 134 may include, for example, one or more moveable ground engaging structures 110 or 112 that are moveable in a manner so as to alter the direction of movement of boundary vehicle 102 or roving vehicle 104. For example, direction control mechanisms 132 and 134 may include one or more wheels 114 or 115 that are moveable by direction control mechanism 132 or 134, respectively, using, for example, a solenoid or appropriate stepper or other motor, so as to change an angle of the axis of rotation of such wheels 114 or 115 with respect to body 106 or 108, thereby to steer the direction of movement of boundary vehicle 102 or roving vehicle 104 in a conventional manner. Alternatively, direction control mechanisms 132 and 134 may be implemented as part of, or as an additional function of, speed control mechanisms 124 and 126, respectively. In this case, direction control mechanisms 132 and 134 may employ speed control mechanisms 124 and 126 as described above, for example, to impart different drive speeds simultaneously to moveable ground engaging structures on opposite sides of body 106 or 108, thereby changing the direction of movement of boundary vehicle 102 or roving vehicle 104 in a known manner.

One or more task payloads 140 may be attached to body 108 of roving vehicle 104. Task payloads 140 define one or more task or mission functions of roving vehicle 104. For example, in the context of yard work and related functions, task payloads 140 may include one or more of mower payload 142, such as including one or more mower blades, cargo payload 144, such as a bin, bed, bucket, or other container or structure for containing or supporting materials of any type to be transported by roving vehicle 104, vacuum payload 146, such as a vacuum for collecting leaves or other yard debris, sweeper payload 148, such as a rotating sweeper for collecting debris or brushing away debris or snow, etc., tiller payload 150, such as including rotating tiller blades, plow payload 152, such as for plowing snow or soil, snow removal payload 154, such as including an auger and impeller, and spreader payload 156, such as for spreading seed, chemicals such as fertilizer, or the like.

Roving vehicle 104 in accordance with an illustrative embodiment may include other and/or different task payloads from those disclosed by example herein. Furthermore, roving vehicle 104 may include multiple different task payloads 140 in desired combinations. For example, a roving vehicle spreader in accordance with an illustrative embodiment may include spreader payload 156 for spreading fertilizer or seed and cargo payload 144 for containing the fertilizer or seed to be spread by spreader payload 156. A roving vehicle lawn mower in accordance with an illustrative embodiment may include mower payload 142, for cutting grass, vacuum payload 146, for collecting cut grass clippings, and cargo payload 144, for transporting the collected grass clippings for disposal.

Power for task payloads 140 may be provided by motor 122 used to provide power for movement of roving vehicle 104 or from a separate power source. Operation of task payloads 140 may be controlled by one or more task payload control signals 158.

Boundary vehicle 102 includes controller 160. Similarly, roving vehicle 104 includes controller 162. Controllers 160 and 162 may be implemented in any manner appropriate for implementing tethered positioning and other functions in accordance with an illustrative embodiment as described herein. For example, controllers 160 and 162 may be implemented using microcontrollers or other types of programmable devices, using discrete logic circuit components, or using any appropriate combination of programmable devices and/or discrete circuit components. To the extent that a programmable device is used to implement controller 160 or 162, one or more functions of controller 160 or 162 may be implemented in software and/or firmware that is run on the programmable device and that is stored in memory in the programmable device and/or in a separate memory device coupled to the programmable device. Controllers 160 and 162, for boundary vehicle 102 and roving vehicle 104, respectively, may be implemented in the same or different manner.

In accordance with an illustrative embodiment, boundary vehicle 102 and roving vehicle 104 are connected by tether line 164. Tether line 164 extends from housing 166 mounted on body 106 of boundary vehicle 102 and is retractable into housing 166. Tether line 164 is flexible, and may be formed as a monofilament line made, for example, from a synthetic material. Alternatively, tether line 164 may be formed from any type of line, cord, rope, string, wire, cable, or the like that includes a single filament or multiple filaments of synthetic or natural materials, or a combination thereof. In some illustrative embodiments, tether line 164 may include electrical conductors and/or optical conduits, such as for providing communications and/or power signals between boundary vehicle 102 and roving vehicle 104, as will be discussed in more detail below. Preferably, tether line 164 is selected to be wear resistant, thereby to provide a long life for tether line 164 as it is extended from and retracted into housing 166 many times during the useful life of boundary vehicle 102. Preferably, tether line 164 is selected to be resistant to tangling, to prevent tangling of tether line 164 as tether line 164 is extended from and retracted into housing 166. Preferably, tether line 164 also is selected to be resistant to stretching.

Coupling structure 168 is provided on the distal end of tether line 164, that is, on the end of tether line 164 opposite housing 166. Corresponding coupling structure 170 is provided on body 108 of roving vehicle 104. Coupling structures 168 and 170 may be implemented in any appropriate manner in order to provide for removable coupling of tether line 164 to roving vehicle 104 by engaging coupling structure 168 with coupling structure 170. In a case where tether line 164 includes electrical conductors and/or optical conduits, coupling structures 168 and 170 preferably also may provide for an electrical and/or optical connection between the electrical conductors and/or optical conduits in tether line 164 and roving vehicle 104 when coupling structures 168 and 170 are engaged. Coupling structure 168 on the distal end of tether line 164 also prevents the distal end of tether line 164 from being drawn into housing 166.

Tether line 164 is part of tether line system 171. In addition to tether line 164, tether line system 171 may include reel 172, tensioning mechanism 174, arm 176, line extension monitoring device 178, and line angle monitoring device 180. All of these additional components, which will be described in more detail below, may be contained in housing 166.

Tether line 164 preferably is wound about spool or reel 172 located in housing 166. Tensioning mechanism 174 coupled to reel 172 preferably applies winding force to reel 172, thereby to maintain tension on line 164 as it is extended from housing 166. In other words, tensioning mechanism 174 causes line 164 to be retracted automatically, by winding about reel 172, thereby pulling distal end of line 164 toward housing 166 in the absence of any force applied to coupling structure 168, such as by roving vehicle 104, to extend line 164 from housing 166. As will be discussed in more detail below, tensioning mechanism 174 may be implemented as a purely mechanical device and/or as an electro-mechanical device. Line 164 preferably is directed from reel 172 out of housing 166 by arm 176. Arm 176 supports line 164 as line 164 is directed or fed out from housing 166, and will be described in more detail below.

As will be discussed in more detail below, in accordance with an illustrative embodiment, boundary vehicle 102 controls movement of roving vehicle 104 in an accurate manner by accurately determining the position of roving vehicle 104 relative to boundary vehicle 102. In accordance with an illustrative embodiment, boundary vehicle 102 determines the relative position of roving vehicle 104 from the length of extension and angle of tether line 164 with respect to boundary vehicle 102 as the distal end of tether line 164, attached to roving vehicle 104, is moved as roving vehicle 104 is moved through an area. To perform this function, boundary vehicle controller 160 monitors the extended length of tether line 164 as provided by line extension monitoring device 178. As will be discussed in more detail below, line extension monitoring device 178 may be provided adjacent to reel 172 in housing 166 and may determine the extended length of line 164 by monitoring rotation of reel 172 around which line 164 is wound. Controller 160 monitors the angle of tether line 164 with respect to body 106 of boundary vehicle 102 as provided by line angle monitoring device 180. As will be discussed in more detail below, line angle monitoring device 180 may be provided adjacent to arm 176 in housing 166 and may determine the angle of tether line 164 by monitoring force applied to arm 176, or angular displacement of arm 176, by line 164 as the angle of line 164 with respect to body 106 of boundary vehicle 102 is changed by movement of roving vehicle 104. Angle monitoring device 180 may provide for monitoring the angle of line 164 in only the horizontal plane, or in both the vertical and horizontal planes.

In accordance with an illustrative embodiment, boundary vehicle controller 160 implements movement control function 181. Movement control function 181 may include the generation of speed control signals 128 and direction control signals 136, that are provided to speed control mechanism 124 and to direction control mechanism 132, respectively, thereby to control the direction and speed of movement of boundary vehicle 102 in the manner described above.

In accordance with an illustrative embodiment, movement control function 181 controls the movement of boundary vehicle 102 to follow a defined path. For example, the defined path may define the boundary of a work area in which roving vehicle 104 is to perform a task mission. The path may be defined, for example, by a boundary wire that extends along the defined path, and that may be buried below, or embedded in, the surface over which boundary vehicle 102 is to travel. The boundary wire may carry an electrical signal that is detectable by boundary vehicle 102. For example, boundary vehicle 102 may include one or more boundary wire detection sensors 182 that allow boundary vehicle 102 to detect when it is in position on the defined path above the boundary wire. Boundary wire detection sensors 182 may include, for example, one or more inductors in combination with appropriate detection circuitry.

Boundary wire detection sensors 182 form part of localization perception system 183 for boundary vehicle 102. In general, localization perception system 183 includes one or more sensors for detecting the position of boundary vehicle 102. The output of localization perception system 183 is provided to controller 160, to be employed by self-localization function 184 of controller 160 for determining the position of boundary vehicle 102 at any moment in time. For example, self-localization function 184 may employ the output of wire detection sensors 182 for determining whether boundary vehicle 102 is on a defined path and for maintaining boundary vehicle 102 on that path as boundary vehicle 102 is moved along the path by movement function 181. Localization perception 183 also may include odometer 186. For example, odometer 186 may be coupled to one or more movable ground engaging structures 110 to monitor the distance of movement of boundary vehicle 102. The output of odometer 186 also may be provided to controller 160, to be used by self-localization function 184, in combination with the output of wire detection sensor 182, to determine the position along the wire-defined path at which boundary vehicle 102 is located at any point in time.

Localization perception 183 may include other devices and/or systems for determining the position of boundary vehicle 102. Such other localization perception devices 183 may be employed in cases where systems and/or methods other than use of a wire carrying a signal are employed to define the boundary or another path which boundary vehicle 102 is to traverse. For example, localization perception devices 183 may include optical detectors, in cases where the boundary or other path to be traversed by boundary vehicle 102 is defined by light beams, such as laser beams, or optically detectable markers. Alternatively, localization perception 183 may include a global positioning system (GPS) or other similar receiver, in cases where the boundary or other path to be traversed by boundary vehicle 102 is defined with respect to a map stored in controller 160.

In accordance with an illustrative embodiment, roving vehicle 104 also may include one or more localization perception devices 187. For example, localization perception devices 187 may include a device for detecting a boundary line defined by a wire carrying a signal and an odometer, as described above. Alternatively, localization perception devices 187 may include other types of devices, as also described above. As will be discussed in more detail below, localization perception devices 187 on roving vehicle 104 may be used for implementation of mapping function 189 by robot system 100. In accordance with an illustrative embodiment, roving vehicle 104 also may include a line angle monitoring device for monitoring an angle of tether line 164 with respect to roving vehicle 104. Such a line angle monitoring device on roving vehicle 104 may be implemented in the same manner as line angle monitoring device 180 on boundary vehicle 102, to provide line angle monitoring in the horizontal plane or in both the vertical and horizontal planes. As will be discussed in more detail below, a line angle monitoring device on roving vehicle 104 also may be used for implementation of mapping function 189 by robot system 100.

In accordance with an illustrative embodiment, boundary vehicle 102 controls the movement of roving vehicle 104 via roving vehicle control function 190. Roving vehicle control function 190 may be used to control the movement of roving vehicle 104 to perform a mission task. For example, roving vehicle control function 190 may be used to control roving vehicle 104 to perform a mission task in an area defined by a boundary. Roving vehicle control function 190 includes controlling the position of roving vehicle 104 in the mission area. As discussed above, controller 160 determines accurately the position of boundary vehicle 102 along the mission area boundary via localization function 184. The position of roving vehicle 104 with respect to boundary vehicle 102 at any point in time may be determined by controller 160, as part of remote vehicle control function 190, from the extension length and angle of tether line 164 at that point in time. Basic geometry calculations may be employed to determine the relative position of roving vehicle 104 from the extension length and angle of tether line 164. Thus, in accordance with an illustrative embodiment, boundary vehicle 102 is able to control accurately the movement of roving vehicle 104 in an area using relative position information derived from tether line system 171.

In accordance with an illustrative embodiment, the controlled path of movement of roving vehicle 104 is relative to or dependent upon the position of boundary vehicle 102. However, the controlled path of movement of roving vehicle 104 is not dependent upon the path of movement of boundary vehicle 102. In other words, the controlled path of movement of roving vehicle 104 may be different from the path of movement of boundary vehicle 102. Movement of roving vehicle 104 therefore is not limited to following the path of movement of boundary vehicle 102.

Remote vehicle control function 190 may include the generation of movement control and other signals that are transmitted from boundary vehicle 102 to roving vehicle 104. For example, such control signals may be transmitted from boundary vehicle 102 via transmitter 191 and received by roving vehicle 104 via receiver 192. Transmitter 191 and receiver 192 may be implemented using conventional radio frequency receivers/transmitters. In this case, appropriate radio frequency antennas 193 and 194 may be coupled to transmitter 191 and receiver 192 and mounted on body 106 of boundary vehicle 102 and body 108 of roving vehicle 104, respectively. Alternatively, movement and other control signals may be transmitted from boundary vehicle 102 to roving vehicle 104 in some other manner, such as via electrical conductors or optical conduits that form a part of tether line 164.

In accordance with an illustrative embodiment, movement control instructions received by roving vehicle 104 from boundary vehicle 102 may be employed by movement control function 195 implemented in roving vehicle controller 162. Movement control function 195 may include the generation of speed control signals 130 and direction control signals 138 that are provided to speed control mechanism 126 and to direction control mechanism 134, respectively, thereby to control the direction and speed of movement of roving vehicle 104 in response to the movement control instructions received from boundary vehicle 102.

Task control function 196 also may be implemented by controller 162. Task control function 196 may include the generation of task control signals 158 to control the operation of one or more task payloads 140 that may be provided on roving vehicle 140. The implementation and operation of task control function 196 will depend upon the particular task payloads 140 to be controlled.

Controller 160 on boundary vehicle 102 preferably implements safeguarding function 197. Similarly, controller 162 on roving vehicle 104 preferably implements safeguarding function 198. Safeguarding functions 197 and 198 prevent damage to vehicles 102 and 104 and to objects in the vehicles' environment. Safeguarding functions 197 and 198 may employ input provided by one or more safeguarding perception devices provided on boundary vehicle 102 and roving vehicle 104, respectively. For example, safeguarding perception devices may include optical, sonic, and/or physical contact sensors that provide signals to controllers 160 and 162 from which the presence of potentially damaging situations may be detected. Safeguarding functions 197 and 198 may be employed by controllers 160 and 162 to stop boundary vehicle 102 or roving vehicle 104, respectively, or to alter the vehicle's direction and/or speed of movement, in response to the detection of a potentially damaging situation.

Power for the various electrical components of robot system 100, including for electrical components of controllers 160 and 162, localization perception devices 183 and 187, transmitter 191, and receiver 192, may be provided, for example, by an appropriate rechargeable battery which may be used exclusively to power such components or to power additional components as well. Preferably an appropriate charging mechanism is provided to charge such a battery.

In accordance with an illustrative embodiment, physical coupling structure 199 may provide for detachable physical coupling of roving vehicle 104 to boundary vehicle 102. Coupling structure 199 may be implemented as any structure that allows roving vehicle 104 to be moved by boundary vehicle 102 without operation of roving vehicle 104. For example, coupling structure 199 may include a hitch mechanism, whereby roving vehicle 104 may be pulled by boundary vehicle 102. Alternatively, coupling structure 199 may include a shelf or other structure extending from boundary vehicle 102 and onto which roving vehicle 104 may be driven or placed for transportation by boundary vehicle 102.

When it is stated herein that a structure is attached to body 106 or 108, such structure may be attached directly to body 106 or 108 or indirectly to body 106 or 108 via an intermediate structure.

Various functional components of robot system 100, such as motors 120 and 122, speed control mechanisms 124 and 126, direction control mechanisms 132 and 134, and task payloads 140, may include appropriate mechanical, electrical, and/or electro-mechanical devices and/or structures in appropriate combinations for converting control signals from controllers 160 and 162, such as speed control signals 128 and 130, direction control signals 136 and 138, and task payload control signals 158, into the appropriate mechanical action in these components. The particular devices and/or structures to be employed will depend upon the implementation of the functional components for a particular robot system 100 or application thereof in accordance with an illustrative embodiment, and will be known to those having skill in the art.

The illustration of FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, task payloads 140 are shown in FIG. 1 as being provided only on roving vehicle 104. Boundary vehicle 102 also may include one or more task payloads 140. Furthermore, more than one roving vehicle 104 may be attached to boundary vehicle 102 for control thereby in the manner described. Different roving vehicles 104, having different task payloads 140, may be coupled alternatively to the distal end of tether line 164 via coupling structure 168. Alternatively, multiple different roving vehicles 104 may be coupled simultaneously to boundary vehicle 102 for simultaneous or alternate control by boundary vehicle 102 in the manner described. In this case, multiple tether line systems 171 may be provided on a single boundary vehicle. Also, tether line system 171 may be made removable from boundary vehicle 102, so that a single tether line system 171 may be used with multiple different boundary vehicles.

Figure 2:
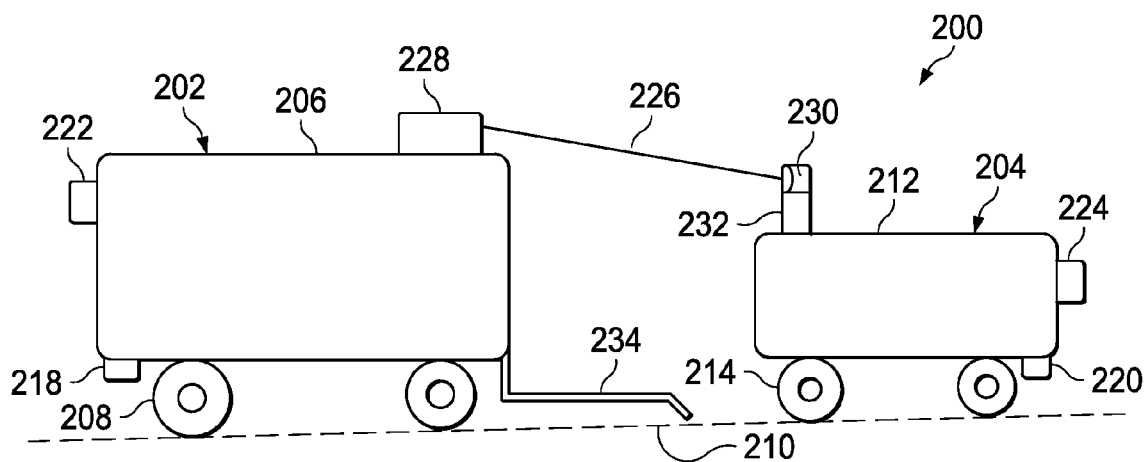
FIG. 2 is a side-view representational illustration of a boundary vehicle and a roving vehicle in operation using tethered positioning in accordance with an illustrative embodiment.

Operation of a robot system employing tethered positioning in accordance with an illustrative embodiment is described in more detail with reference to FIG. 2, showing a side view representational illustration of robot system 200. In this example, robot system 200 is an example of one implementation of robot system 100 in FIG. 1. Side view representational illustrations of boundary vehicle 202 and roving vehicle 204 are shown in FIG. 2. In this example, boundary vehicle 202 is an example of one implementation of boundary vehicle 102 in FIG. 1 and roving vehicle 204 is an example of one implementation of roving vehicle 104 in FIG. 1.

Boundary vehicle 202 includes body 206 supported by wheels 208. In this example, wheels 208 are an example of movable ground engaging structures 110 in FIG. 1. As described above, wheels 208 are driven by boundary vehicle 202 to propel boundary vehicle 202 automatically across surface 210.

Similarly, roving vehicle 204 includes body 212 supported by wheels 214. In this example, wheels 214 are an example of movable ground engaging structures 112 in FIG. 1. As described above, wheels 214 are driven by roving vehicle 204 to propel roving vehicle 204 across surface 210 in response to movement control signals received from boundary vehicle 202.

As described above, boundary vehicle 202 is controlled to move automatically across surface 210 along a defined boundary or other path. The boundary or other path may be defined, for example, by wire 216. Wire 216 may be positioned below, or embedded in, surface 210, and may carry a detectable signal. In order to maintain its position on the defined boundary or other path, boundary vehicle 202 may employ one or more devices for localization perception. For example, where the path is defined by wire 216 carrying a signal, localization perception device 218 may be mounted at or near the bottom of body 206, and may include a device for detecting the signal in wire 216.

Similarly, roving vehicle 204 may include localization perception device 220 mounted at or near the bottom of body 212. Localization perception device 220 may include a device for detecting a signal in wire 216 positioned below, or embedded in, surface 210 for defining the path of travel of roving vehicle 204, for example, while performing a map creation function, as will be described in more detail below.

As discussed above, one or more safeguarding perception devices 222 and 224 may be mounted on body 206 of boundary vehicle 202 and on body 212 of roving vehicle 204, respectively. For example, safeguarding perception devices 222 and 224 may include optical, sonic, and/or physical contact sensors that provide signals for indicating the detection of objects or surface features that may be hazardous to vehicles 202 and 204 and/or the detection of objects in the path of vehicles 202 and 204 that might be harmed or damaged by vehicles 202 and 204. As discussed above, the direction and/or speed of movement of vehicle 202 or 204 may be altered in response to the detection of a potentially damaging situation by safeguarding perception devices 222 or 224, respectively.

In accordance with an illustrative embodiment, boundary vehicle 202 determines the position of remote vehicle 204 relative to boundary vehicle 202 from an extension length and angle of tether line 226 extending from boundary vehicle 202 to remote vehicle 204. Tether line 226 extends from housing 228 on body 206 of boundary vehicle 202 and is attached at the distal end thereof via coupling structure 230 to roving vehicle 204. Preferably sufficient clearance may be provided between surface 210 and tether line 226, such as by attaching housing 228 to the top of body 206 and attaching the distal end of line 226 at the top of post 232 or other structure extending upward from body 212 of roving vehicle 204.

In accordance with an illustrative embodiment, boundary vehicle 202 may include a coupling structure for transporting roving vehicle 204. For example, boundary vehicle 202 may include a hitch that may be coupled to roving vehicle 204 for pulling roving vehicle 204. Alternatively, boundary vehicle 202 may include shelf 234 extending from body 206. Shelf 234 is configured to support roving vehicle 204 for transportation by boundary vehicle 202. For example, boundary vehicle 202 may control roving vehicle 204 to drive onto shelf 234 when boundary vehicle 202 is to transport roving vehicle 204.

Figure 3:
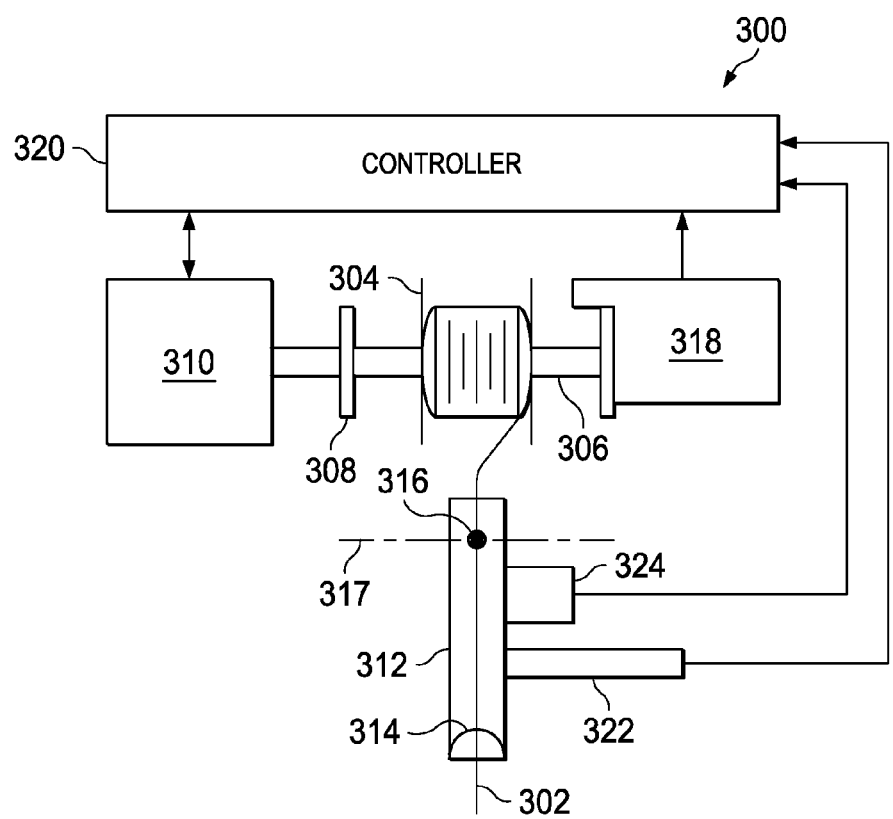
FIG. 3 is a representational illustration of a retractable line tether system for tethered positioning in accordance with an illustrative embodiment.

Tether line system 300 for use in tethered positioning in accordance with an illustrative embodiment is described in more detail with reference to FIG. 3, which shows representational components of such a system. In this example, tether line system 300 is an example of tether line system 171 in FIG. 1. Components of tether line system 300 are illustrated in representational form in FIG. 3 in order to explain generally the functions performed by the components both individually and in relation to other components. Based on the description provided, a person of ordinary skill in the art will be able to select actual physical components that perform the functions described in order to assemble a tether line system as described and illustrated.

Tether line system 300 includes tether line 302. Line 302 is wound around reel 304 or spool. Reel 304 includes an axle 306 or other structure by which reel 304 is supported on reel support structure 308. Reel 304 is mounted on support structure 308 such that reel 304 is rotatable about an axis thereof corresponding with axle 306. Reel 304, axle 306, and/or reel support structure 308 may thus include appropriate bearings and other structures to provide for rotation of reel 304 in a conventional manner. As line 302 is extended, reel 304 turns in one direction, as line 302 is unwound from reel 304. As line 302 is retracted, reel 304 turns in the opposite direction, as line 302 is wound around reel 304.

Tensioning mechanism 310 is coupled to reel 304 to bias reel 304 for rotation in the retraction direction of line 302. That is, tensioning mechanism 310 exerts a force on reel 304 so as to turn reel 304 in the direction to wind line 302 around reel 304 in the absence of any force pulling on line 302 to overcome the applied tension and thereby to extend line 302 by unwinding line 302 from reel 304. Tensioning mechanism 310 thus maintains line 302 taut as it is extended from reel 304. Tensioning mechanism 310 may be coupled to reel 304 via axle 306, or in any other appropriate manner depending upon the specific implementation of reel 304 and tensioning mechanism 310.

Tensioning mechanism 310 may be implemented as a purely mechanical structure, such as using a spring. Alternatively, tensioning mechanism 310 may be implemented as an electro-mechanical structure, such as using a DC or other motor coupled to reel 304 and operated to apply a desired torque to reel 304 in the direction to wind line 302 around reel 304. As another alternative, tensioning mechanism 310 may include a combination of mechanical and electro-mechanical structures, such as using a motor with a spring assist coupled to reel 304 to provide the desired degree of tension on line 302. Where tensioning mechanism 310 includes an electro-mechanical device, such as a motor, control and/or monitoring of tensioning mechanism 310 may be provided by controller 320 to control and/or monitor the degree of tension provided on line 302. In this example, controller 320 is an example of one implementation of controller 160 in FIG. 1.

Arm 312 is provided to guide or feed line 302 from reel 304. Arm 312 is an elongated structure. Arm 312 may be implemented, for example, as a tube through which line 302 is run from reel 304. Alternatively, arm 312 may be implemented as a bar, rod, or other elongated structure having one or more eyelets or loops 314 or other structures attached thereto through which line 302 is run. Arm 312 preferably is rigid or semi-rigid, and may be made of any material and by any method appropriate for the desired form and degree of rigidity of arm 312. Arm 312 is secured to at least one mounting point 316. Arm 312 may be secured fixedly to mounting point 316 or may be secured for rotation about mounting point 316 with a biasing mechanism provided to bias arm 312 into a neutral rotational position.

Rotation of arm 312 about mounting point 316 may be restricted to a single plane, such as the horizontal plane. In this case, mounting point 316 forms an axis of rotation extending vertically through mounting point 316 at a right angle with respect to the drawing of FIG. 3. Alternatively, arm 312 may be mounted so as to provide for rotation of arm 312 in both the horizontal plane and in the vertical plane. Arm 312 may be rotatable in the vertical plane about horizontal axis 317. Horizontal axis 317 may, but need not, pass through the vertical axis extending through mounting point 316.

In accordance with an illustrative embodiment, an extended length of line 302 may be determined using line extension monitoring device 318. For example, line extension monitoring device 318 may be mounted adjacent to reel 304 in order to monitor the extended length of line 302 by monitoring rotation of reel 304. Preferably, line extension monitoring device 318 may include a conventional rotary encoder, also called a shaft encoder, coupled to axle 306. A rotary encoder is an electro-mechanical device that converts the angular position of axle 306 to an analog or digital code, making it an angle transducer. This angular position information may be provided to controller 320. Controller 320 then determines the extended length of line 302 from the detected rotation of reel 304 as provided by line extension monitoring device 318.

Alternatively, other structures and/or devices may be used to implement line extension monitoring device 318. Line extension monitoring device 318 may, for example, include a magnetic field detector that detects the passing of magnets mounted on reel 304 as reel 304 is rotated. Alternatively, line extension monitoring device 318 may include an optical detection device that detects the passing of optically detectable markings provided on reel 304 as reel 304 is rotated. In either case, line extension monitoring device 318 may provide a count signal to controller 320 related to rotation of reel 304. Controller 320 may then determine the extended length of line 302 based on rotation of reel 304. Any other devices or methods currently known or which become known in the art may be used to implement line extension monitoring device 318 in accordance with an illustrative embodiment.

In accordance with an illustrative embodiment, an angle of line 302 may be monitored using horizontal angle monitoring device 322. Horizontal angle monitoring device 322 may include a linear encoder that is coupled, for example, to arm 312. For example, horizontal angle monitoring device 322 may include a linear encoder that includes a pressure transducer that is coupled to arm 312. As line 302 is moved in the horizontal plane, arm 312 is displaced in the horizontal plane, either by bending arm 312 or rotation about point 316. The pressure transducer generates a signal that is relative to the degree of displacement. This signal is encoded by the linear encoder and provided to controller 320. Controller 320 then determines the angle of line 302 in the horizontal plane from the detected displacement of arm 312. Alternatively, an optical or mechanical sensor may be employed by the linear encoder to detect displacement of arm 312 in order to provide for determination of the angle of line 302 from the displacement of arm 312. As another alternative, horizontal angle monitoring device 322 may include a rotary encoder coupled to arm 312 at rotation point 316. In this case, the rotary encoder detects angular displacement of arm 312 by line 302 and provides a signal to controller 320 relative to a change in the angular position of arm 312 about the vertical axis of rotation at point 316. Any other devices or methods currently known or which become known in the art may be employed in accordance with an illustrative embodiment to implement horizontal angle monitoring device 322.

Although only horizontal angle monitoring device 322 may be employed, in accordance with an illustrative embodiment, the angle of line 302 in the vertical plane preferably also may be monitored, using vertical angle monitoring device 324. Vertical angle monitoring device 324 also may include a linear encoder that is coupled, for example, to arm 312. For example, vertical angle monitoring device 324 may include a linear encoder that includes a pressure transducer that is coupled to arm 312. As line 302 is moved in the vertical plane, arm 312 is displaced in the vertical plane, either by bending arm 312 or rotation about horizontal axis 317. The pressure transducer generates a signal that is relative to the degree of displacement. This signal is encoded by the linear encoder and provided to controller 320. Controller 320 then determines the angle of line 302 in the vertical plane from the detected displacement of arm 312. Alternatively, an optical or mechanical sensor may be employed by the linear encoder to detect displacement of arm 312 in order to provide for determination of the angle of line 302 in the vertical plane from the displacement of arm 312. As another alternative, vertical angle monitoring device 324 may include a rotary encoder coupled to arm 312 at horizontal axis 317. In this case, the rotary encoder detects angular displacement of arm 312 by line 302 and provides a signal to controller 320 relative to a change in the angular position of arm 312 about horizontal axis of rotation 317. Any other devices or methods currently known or which become known in the art may be employed in accordance with an illustrative embodiment to implement vertical angle monitoring device 324.

As discussed above, controller 320 may be implemented using a programmable device and/or discrete logic components in any desired combination to implement the functions of tethered positioning in accordance with an illustrative embodiment. Using line extension monitoring provided by line extension monitoring device 318 in combination with line angle monitoring provided by line angle monitoring devices 322 and 324, controller 320 determines accurately a current position of a roving vehicle attached to the distal end of line 302 with respect to a boundary vehicle on which tether line system 300 is mounted. Use of both horizontal angle monitoring device 322 and vertical angle monitoring device 324 provides both horizontal and vertical line angle monitoring for controller 320. A more accurate position determination may be made by controller 320 when both horizontal and vertical line angle information is available. The availability of such information allows differences of elevation and pitch and roll orientation of the boundary vehicle and roving vehicle to be taken into account when determining the relative position of the roving vehicle. These factors otherwise might adversely affect the position determination in many applications, such as where the roving vehicle is being used to mow an uneven or undulating lawn. Other solutions to this problem may include, for example, mounting appropriate portions of tether line system 300 on gimbals, and/or providing tilt sensors on the boundary vehicle and/or roving vehicle to provide pitch and roll information to controller 320. Where the area to be traversed by the roving vehicle is relatively flat, horizontal line angle information provided by horizontal line angle monitoring device 322 alone may be sufficient for controller 320 to make an accurate determination of the position of the roving vehicle.

Tethered positioning in accordance with an illustrative embodiment may be used to control accurately the position of a roving vehicle as the vehicle moves through an area performing a task. Tethered positioning in accordance with an illustrative embodiment also may be used to map the area to be covered by the roving vehicle in order that a planned path for the roving vehicle through the area may be developed, so that the roving vehicle may perform its task both effectively and efficiently with minimal path overlap.

Figure 4:
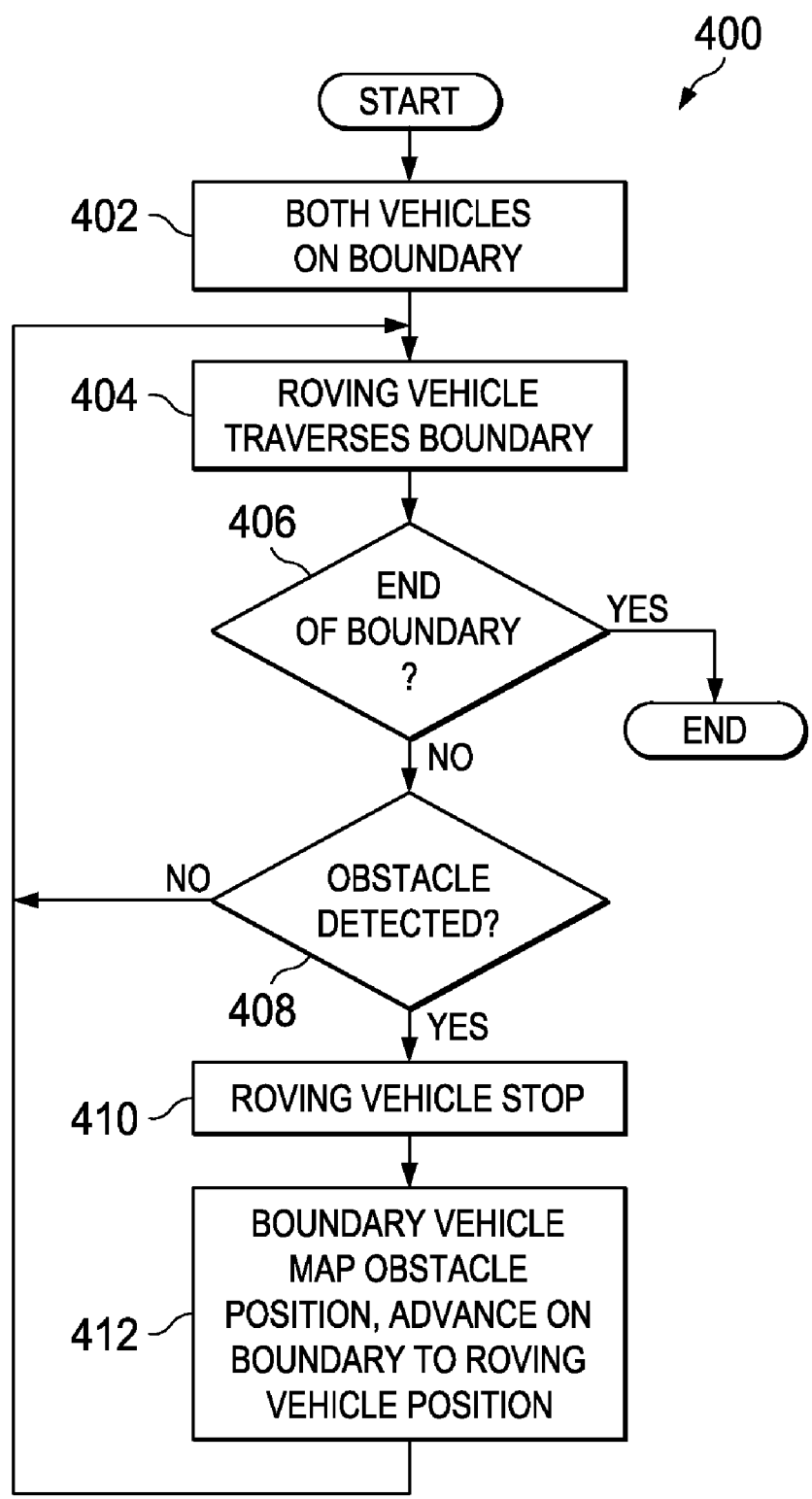
FIG. 4 is a flowchart of a map creation method implemented by vehicles employing tethered positioning in accordance with an illustrative embodiment.

Method 400 for mapping an area using tethered positioning in accordance with an illustrative embodiment is presented in the flowchart diagram of FIG. 4. Method 400 may be performed by a boundary vehicle and a roving vehicle employing tethered positioning in accordance with an illustrative embodiment to map an area defined by a boundary. For example, method 400 may be performed by boundary vehicle 102 and roving vehicle 104, as described above with reference to FIG. 1, to create a map for an area defined along its perimeter by a boundary wire carrying a detectable signal.

Method 400 begins with both the boundary vehicle and the roving vehicle positioned on the boundary of the area to be mapped (step 402). For example, step 402 may include positioning the boundary vehicle and the roving vehicle adjacent to each other at a starting position on the boundary. With the boundary vehicle remaining in position, the roving vehicle begins to traverse the boundary, preferably at a fixed and steady rate (step 404). For example, step 404 may include controlling the direction and speed of movement of the roving vehicle in response to input from localization sensors, such as boundary wire sensors, on the roving vehicle in order to keep the roving vehicle on the defined boundary as it proceeds along the boundary. As the roving vehicle proceeds along the boundary, a tether line from the boundary vehicle to the roving vehicle is extended. The boundary vehicle records the tether line length of extension and angle information while remaining stationary. The roving vehicle continues to traverse the boundary until it reaches the end of the boundary (step 406).

While traversing the boundary, the tether line between the boundary vehicle and the roving vehicle may contact an obstacle in the area being mapped between the boundary vehicle and the roving vehicle. This contact with an obstacle in the area being mapped is detected by the boundary vehicle (step 408).

Step 408 may include direct detection of an obstacle by contact of the obstacle with the tether line. For example, the tether line may carry an electromagnetic signal which changes in response to properties, such as electrical permittivity, of objects that come in contact with the line. Changes in the electromagnetic signal carried by the tether line thus may be detected to determine that the tether line has contacted an obstacle in the area being mapped.

Another approach to detecting an obstacle in step 408 employs an odometer on the roving vehicle. As the roving vehicle proceeds along the boundary path, data from the odometer on the roving vehicle is used to generate an estimated position of the roving vehicle with respect to the boundary vehicle. Simultaneously, as the roving vehicle proceeds along the boundary path, data from a line extension monitoring device and the line angle monitoring device on the boundary vehicle are used by the boundary vehicle to generate an estimated relative position for the roving vehicle in the manner described above. When the tether line encounters an obstacle in the area being mapped, the tether line will no longer be straight. Thus, as the roving vehicle continues to move along the boundary path, after the tether line encounters an obstacle, a difference will develop between the estimated roving vehicle position determined from the odometer on the roving vehicle and the estimated roving vehicle position determined from the monitored extension length of the tether line. Thus, a difference between these two estimated determined positions of the roving vehicle that exceeds a threshold may be used to indicate the detection of contact of the tether line with an obstacle in the area being mapped.

In response to detecting contact of the tether line with an obstacle, the roving vehicle is immediately stopped (step 410). Step 410 may include sending a movement control instruction from the boundary vehicle to the roving vehicle to stop motion of the roving vehicle upon detection of the obstacle by the boundary vehicle. The boundary vehicle then maps the obstacle position in the area being mapped and advances along the boundary until the boundary vehicle reaches the position of the roving vehicle along the boundary (step 412). The boundary vehicle then stops, and the process is repeated from step 404.

In accordance with an illustrative embodiment, step 412 may include mapping boundary points of a detected obstacle using tether line angle information from line angle monitoring devices on the boundary vehicle and on the roving vehicle, in combination with tether line length of extension information provided by a length of extension monitoring device, when the tether line is determined to be in contact with the detected obstacle. From the line angle and length of extension information, various estimated positions of the roving vehicle and the boundary vehicle can be calculated. The position of boundary points of a detected obstacle in an area being mapped may be determined from the intersection of lines extending between various ones of the estimated positions and the actual known position of the boundary vehicle. An example of such a method for mapping boundary points of a detected obstacle is described in more detail below.

Traversing of boundary 500 by roving vehicle 502 and boundary vehicle 504 using tethered positioning in accordance with an illustrative embodiment to perform a portion of the map creation function described above is illustrated in FIG. 5 and FIG. 6. In this example, boundary vehicle 504 is an example of boundary vehicle 102 in FIG. 1 and roving vehicle 502 is an example of roving vehicle 104 in FIG. 1.

In this example, boundary 500 defines area 506 to be mapped. For example, area 506 may be a yard to be mowed. Boundary 500 may be defined by a wire to which a signal is provided by boundary wire control 508. As discussed above, boundary vehicle 504 and roving vehicle 502 include localization perception devices that allow both vehicles 502 and 504 to detect the signal in the wire and thus to stay on the path defined by boundary 500 as they traverse boundary 500.

Figure 5:
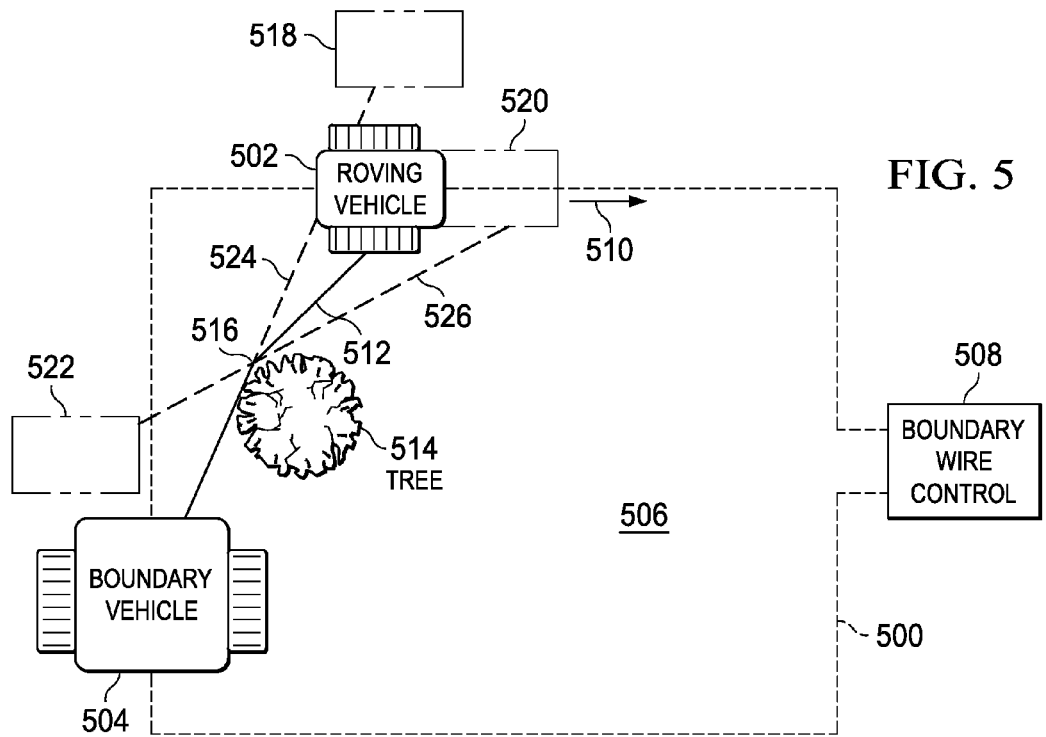
FIGS. 5 and 6 illustrate traversing of a boundary by roving and boundary vehicles using tethered positioning in accordance with an illustrative embodiment while performing a map creation function.

In FIG. 5 a map creation method as described above is in process. Boundary vehicle 504 is stationary on boundary 500. Roving vehicle 502 is proceeding along boundary 500, away from boundary vehicle 504 in the direction indicated by arrow 510, while boundary vehicle 504 records length of extension and angle information provided by tether line 512 connected between boundary vehicle 504 and roving vehicle 502.

As roving vehicle 502 continues to advance in direction 510, tether line 512 contacts obstacle 514 in area 506. In this case, obstacle 514 may be a tree in area 506 of a yard to be mown. Contact of line 512 with tree 514 will be detected by boundary vehicle 504. As discussed above, contact of line 512 with tree 514 may be detected by detecting a change in an electromagnetic signal carried by tether line 512 resulting from contact of line 512 with tree 514. Alternatively, contact of line 512 with tree 514 may be determined by a difference in the calculated positions of roving vehicle 502 with respect to boundary vehicle 504, as derived using an odometer on roving vehicle 502 and as derived using the monitored extension length of line 512, exceeding a threshold. These two calculations of the position of roving vehicle 502 will diverge as roving vehicle 502 continues to move in direction 510 after line 512 contacts tree 514, causing line 514 to bend at point 516 where it contacts tree 514. In response to detecting contact between tether line 512 and tree 514, boundary vehicle 504 instructs roving vehicle 502 to stop.

A method of mapping the boundary points of detected obstacle 514 using tether line angle information from line angle monitoring devices on the boundary vehicle and on the roving vehicle, in combination with tether line length of extension information provided by a length of extension monitoring device, is described in more detail with reference to FIG. 5. Angles and other dimensions are exaggerated in FIG. 5, for ease of explanation and illustration of this method. Actual positions of boundary vehicle 504 and roving vehicle 502 are shown in solid lines in FIG. 5. Both roving vehicle 502 and boundary vehicle 504 are stopped in the positions shown, after contact of tether line 512 with tree 514 is detected, as discussed above.

Boundary vehicle 504 calculates two estimated positions for roving vehicle 502. Estimated position 518 is calculated using the monitored angle of tether line 512 at boundary vehicle 504 and the monitored extended length of tether line 512. Estimated position 518 is calculated as the position that is at a distance corresponding to the monitored extended length of line 512 from boundary vehicle 504 and at an angle with respect to boundary vehicle 504 corresponding to the monitored angle of line 512 as detected at boundary vehicle 504. Estimated position 520 for roving vehicle 502 is calculated as the position on boundary 500, in the direction of roving vehicle 502 from boundary vehicle 504, that is at a straight-line distance from boundary vehicle 504 corresponding to the monitored extended length of line 512. In other words, estimated position 520 is the position on boundary 500 that roving vehicle 502 would be at, with boundary vehicle 504 in its current actual position, at the point where tether line 512 has reached its current monitored extended length, as roving vehicle 502 is moved in direction 510 along boundary 500, had tree 514 not been present in area 506. Tether line angle information from roving vehicle 502 in combination with line length of extension information is used to determine estimated position 522 of boundary vehicle 504. Estimated position 522 of boundary vehicle 504 is calculated as the position that is at a distance corresponding to the monitored extended length of line 512 from roving vehicle 502 and at an angle with respect to roving vehicle 502 corresponding to the monitored line angle at roving vehicle 502.

From the known actual position of boundary vehicle 504 and calculated estimated positions 518 and 520 of roving vehicle 502 and calculated estimated position 522 of boundary vehicle 504, the position in area 506 of point 516 on obstacle 514 can be determined as the intersection of line 524, extending between the actual position of boundary vehicle 504 and estimated position 518 of roving vehicle 502, with line 526, extending between estimated position 520 of roving vehicle 502 and estimated position 522 of boundary vehicle 504.

Point 516 on tree 514 is one point defining the boundary or surface of obstacle 514. By determining the location of point 516 in area 506, a representation of obstacle 514 can be located properly in the map of area 506 being derived. Additional boundary points of obstacle 514 may be determined by incrementally advancing boundary vehicle 504 and roving vehicle 502 along boundary 500 and repeating the calculations just described. In this manner, the position of multiple boundary points of obstacle 514 in area 506 may be determined. If enough boundary points for obstacle 514 are determined in this manner, a representation of the size and shape of obstacle 514 may be included in the map of area 506 being derived.

Figure 6:
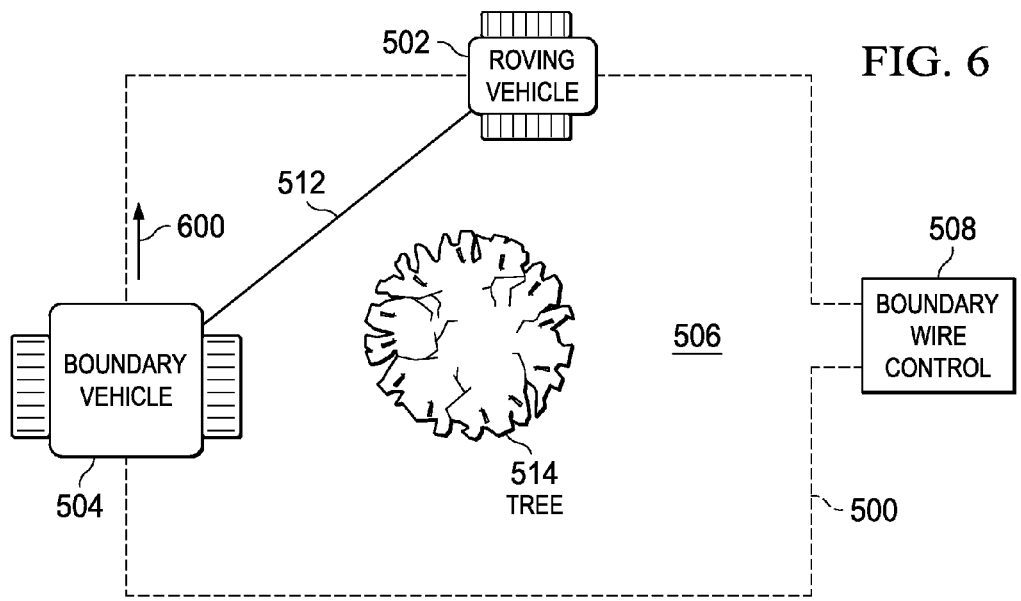

After completing any obstacle mapping as described, roving vehicle 502 is stopped in position on boundary 500. As illustrated in FIG. 6, boundary vehicle 504 then proceeds along boundary 500, in the direction indicated by arrow 600, until boundary vehicle 504 reaches the position of stopped roving vehicle 502. At this point, boundary vehicle 504 is stopped, and roving vehicle 502 is instructed to continue to proceed along boundary 500.

Upon completion of the mapping process, an accurate map of the mission or work area defined by the boundary, including the position of any obstacles therein, is created. From this map, the mission area may be divided into sections, wherein each section is a sub-area of the entire mission area over which a roving vehicle may travel without contacting any obstacles while the boundary vehicle remains in a fixed position on the boundary. The sections may be derived manually from the map, or automatically using an appropriate algorithm.

Figure 7:
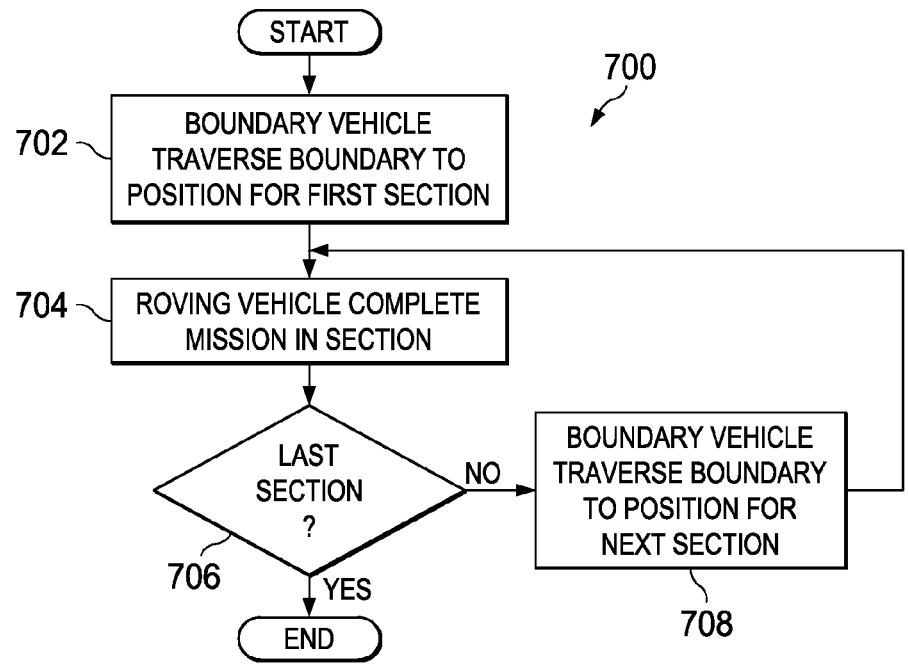
FIG. 7 is a flowchart of a method of controlling vehicle positions using tethered positioning in accordance with an illustrative embodiment to perform a mission task in an area.

Method 700 for performing a work mission or task in an area using tethered positioning in accordance with an illustrative embodiment is presented in the flowchart diagram of FIG. 7. Method 700 may be implemented by a boundary vehicle and a roving vehicle employing tethered positioning in accordance with an illustrative embodiment. For example, method 700 may be implemented using boundary vehicle 102 and roving vehicle 104, as described above with reference to FIG. 1, to perform a work task in an area defined along its perimeter by a boundary wire. In this example, the area is assumed to be divided into one or more sections. A roving vehicle coupled to the boundary vehicle by a tether line may complete the work mission in a particular section without encountering any obstacles while the boundary vehicle remains in a fixed position on the boundary.

Method 700 begins with the boundary vehicle traversing the boundary of a work area to a first position from which the roving vehicle may be controlled to perform a work mission or task in a first section of the area (step 702). The boundary vehicle stops when it reaches the desired position. Step 702 may include transporting the roving vehicle to the starting position by the boundary vehicle, such as by towing the roving vehicle or transporting the roving vehicle on a shelf provided on the boundary vehicle. The roving vehicle then is controlled by the boundary vehicle to complete a mission, such as one or more tasks, in the section (step 704). If this is the last section of the area to be worked, the process is complete (step 706). However, if other sections of the area remain to be worked, the boundary vehicle moves along the boundary to the next position from which the roving vehicle may be controlled to perform a work mission or task in the next section (step 708). Step 708 may include transporting the roving vehicle to the next location, as described above. Steps 704 through 708 are repeated until the mission is completed in all of the defined sections.

Figure 8:
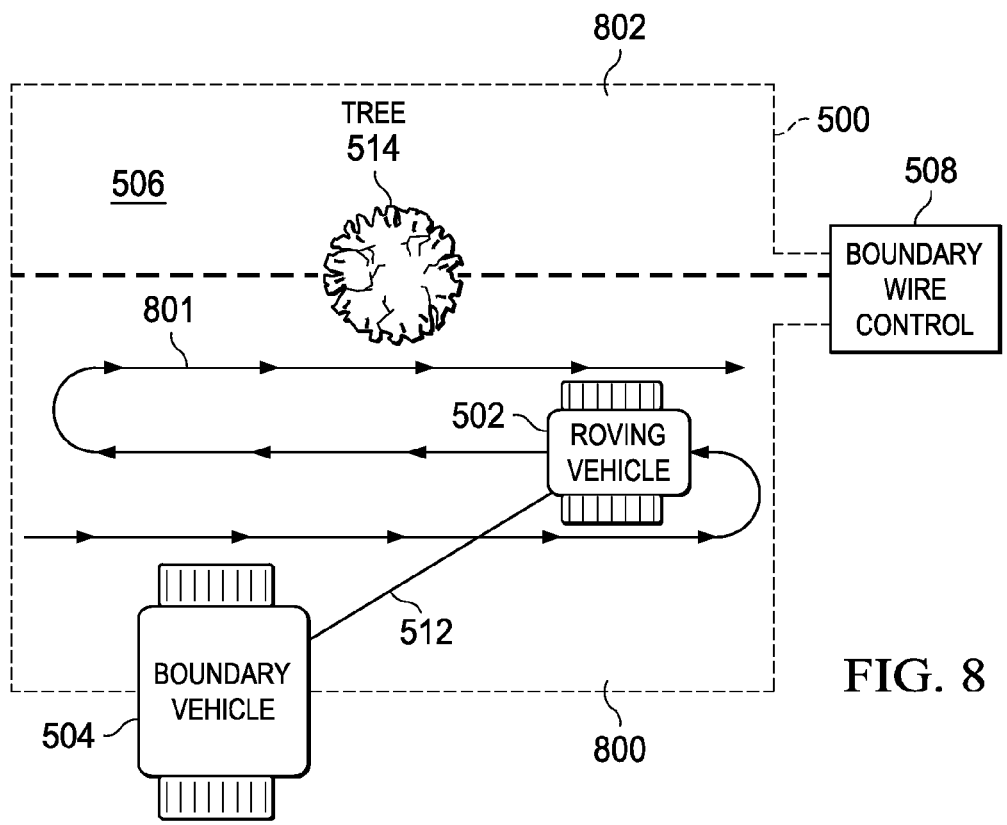
FIG. 8 illustrates positioning control of a roving vehicle by a boundary vehicle using tethered positioning in accordance with an illustrative embodiment to perform a mission task in an area.

Positioning control of roving vehicle 502 by boundary vehicle 504 using tethered positioning in accordance with an illustrative embodiment to perform a mission task in area 506 defined by boundary 500 is illustrated in FIG. 8. As discussed previously, with reference to FIG. 5, area 506 may be a lawn to be mown that is defined by boundary 500 and which contains an obstacle represented by tree 514. Boundary 500 is defined by a wire having a signal provided thereto by boundary wire control 508.

Based on the map of area 506, which was created as described previously, area 506 is divided into sections 800 and 802. From the position of boundary vehicle 504 on boundary 500 as illustrated in FIG. 8, boundary vehicle 504 can control roving vehicle 502 to cover the entire area of section 800 without roving vehicle 502, or tether line 512 connecting boundary vehicle 504 to roving vehicle 502, contacting obstacle 514. For example, roving vehicle 504 may include a mower task payload, and may be controlled by boundary vehicle 504, using tethered positioning in the manner described herein, to mow section 800 with minimal path overlap. For example, roving vehicle 502 may be controlled by boundary vehicle 504 to traverse path 801 in section 800. Path 801 may be generated using an area coverage path planner computer program, such as those well known in the art. When mowing of section 800 is complete, boundary vehicle 504 may move to another position along boundary 500, from which roving vehicle 502 may be controlled by boundary vehicle 504 to mow section 802.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or partition of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending on the functionality involved. Also, other blocks may be added in addition to the illustrated blocks in a flowchart or block diagram.

The description of the different advantageous embodiments has been presented for purposes of illustration and explanation, and is not intended to be exhaustive or to limit the embodiments to the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A mobile machine, comprising:
a localization detection device;
a tether line that is extendable and attached at a distal end to a second machine;
a line extension monitoring device configured to monitor a length of extension of the tether line; and
a controller coupled to the localization detection device and the line extension monitoring device and configured to control automatically movement of the mobile machine along a defined path and to control movement of the second machine, wherein the movement of the second machine is dependent upon a position of the mobile machine but independent of the defined path of the mobile machine, wherein the defined path is defined by a wire carrying a signal and wherein the localization detection device includes a device for detecting the signal in the wire.

2. The mobile machine of claim 1, wherein the defined path is a boundary defining an area and wherein the controller is configured to control the movement of the second machine to perform a task in the area.

3. The mobile machine of claim 1 further comprising:
a body;
movable ground engaging structures attached to the body; and
a motor coupled to the movable ground engaging structures to drive the movable ground engaging structures to move the mobile machine.

4. The mobile machine of claim 3, wherein the movable ground engaging structures are selected from the group of movable ground engaging structures consisting of wheels, tracks, and legs.

5. The mobile machine of claim 1, wherein the tether line is wound around a spool and wherein the line extension monitoring device is configured to monitor the length of extension of the tether line by monitoring a rotation of the spool.

6. The mobile machine of claim 1, wherein the second machine comprises:
a second machine body;
second movable ground engaging structures attached to the second machine body;
a second machine motor coupled to the second movable ground engaging structures to move the second machine; and
a second machine controller configured to control movement of the second machine.

7. The mobile machine of claim 6, wherein:
the controller is further configured to generate control signals to control the movement of the second machine;
the mobile machine further comprises a transmitter coupled to the controller to transmit the control signals to the second machine;
the second machine further comprises a receiver coupled to the second machine controller to receive the control signals from the mobile machine; and
the second machine controller is configured to control movement of the second machine in response to the control signals from the mobile machine.

8. The mobile machine of claim 7, wherein the control signals are transmitted wirelessly from the mobile machine to the second machine.

9. The mobile machine of claim 7, wherein the control signals are transmitted via the tether line from the mobile machine to the second machine.

10. The mobile machine of claim 6 further comprising a task payload on the second mobile machine.

11. The mobile machine of claim 10, wherein the task payload is selected from the group of task payloads consisting of a mower, a cargo hold, a vacuum, a sweeper, a tiller, a plow, a snow remover, and a spreader.

12. The mobile machine of claim 6, comprising additionally a second localization detection device on the second machine configured to detect the defined path.

13. A mobile machine, comprising:
a localization detection device;
a tether line that is extendable;
a line extension monitoring device configured to monitor a length of extension of the tether line;
a controller coupled to the localization detection device and the line extension monitoring device and configured to control automatically movement of the mobile machine along a defined path, to determine a relative position of a second machine attached to a distal end of the tether line from the monitored length of extension of the tether line, and to control movement of the second machine, wherein the movement of the second machine is dependent upon a position of the mobile machine but independent of the defined path of the mobile machine;
a line angle monitoring device configured to monitor an angle of the tether line; and
wherein the controller is coupled to the line angle monitoring device and is configured to determine a relative position of the second machine from the monitored length of extension and the monitored angle of the tether line.

14. The mobile machine of claim 13, wherein the line angle monitoring device is configured to monitor the angle of the tether line in both a horizontal plane and a vertical plane.

15. A method of controlling a mobile machine, comprising:
detecting by a first mobile machine a position of the first mobile machine along a path, wherein the detecting step includes detecting a signal in a wire defining the path;
automatically moving the first mobile machine along the path;
determining by the first mobile machine a position of a second mobile machine relative to the first mobile machine; and
controlling automatically movement of the second mobile machine by the first mobile machine, wherein the controlled movement of the second mobile machine is dependent upon the position of the first mobile machine along the path but independent of the movement of the first mobile machine along the path.

16. The method of claim 15, wherein the determining step includes determining the position of the second mobile machine from an extension length of the tether line and the angle of the tether line.

17. The method of claim 15, wherein the path is a boundary defining an area, and wherein the controlling step includes controlling movement of the second machine in the area to perform a task in the area.

18. A method of controlling a mobile machine, comprising:
detecting by a first mobile machine a position of the first mobile machine along a path;

automatically moving the first mobile machine along the path;

determining by the first mobile machine a position of a second mobile machine relative to the first mobile machine; and controlling automatically movement of the second mobile machine by the first mobile machine, wherein the controlled movement of the second mobile machine is dependent upon the position of the first mobile machine along the path but independent of the movement of the first mobile machine along the path, wherein the path is a boundary defining an area, and wherein the controlling step includes controlling movement of the second machine along the path to create a map of the area.

19. The method of claim 18 further comprising detecting by the second mobile machine a position of the second mobile machine relative to the path.

20. A system for positioning a mobile machine, comprising:
a first mobile machine;
a localization detection device on the first mobile machine configured to detect a position of the first mobile machine along a path;
a tether line extendable from the first mobile machine and under tension;
a line extension monitoring device configured to monitor a length of extension of the tether line;
a line angle monitoring device configured to monitor an angle of the tether line;
a second mobile machine attached at a distal end of the tether line;
a first controller connected to the localization detection device, to the line extension monitoring device, and to the line angle monitoring device and configured to control automatically movement of the first mobile machine along a defined path, to determine a relative position of the second mobile machine from the monitored length of extension and monitored angle of the tether line, and to generate movement control signals to control movement of the second mobile machine;
a transmitter connected to the first controller and configured to transmit the movement control signals to the second mobile machine;
a receiver configured to receive the movement control signals at the second mobile machine; and
a second controller connected to the receiver and configured to control a position of the second mobile machine in response to the movement control signals received at the second mobile machine.

21. The system of claim 20, wherein the defined path is defined by a wire carrying a signal and wherein the localization detection device includes a device for detecting the signal in the wire.

22. The system of claim 20, wherein the tether line is wound around a spool and wherein the line extension monitoring device is configured to monitor a length of extension of the tether line by monitoring a rotation of the spool.

23. The system of claim 20, wherein the line angle monitoring device is configured to monitor an angle of the tether line in both a horizontal plane and a vertical plane.

24. The system of claim 20, wherein the movement control signals are transmitted wirelessly from the first mobile machine to the second mobile machine.

25. The system of claim 20, wherein the movement control signals are transmitted via the tether line from the first mobile machine to the second mobile machine.

26. The system of claim 20, wherein the defined path is a boundary defining an area and wherein the first controller is configured to generate movement control signals to control the movement of the second mobile machine to perform a task in the area.

27. The system of claim 26, wherein the second mobile machine further comprises a task payload configured to perform the task.

28. The system of claim 27, wherein the task payload is selected from the group of task payloads consisting of a mower, a cargo hold, a vacuum, a sweeper, a tiller, a plow, a snow remover, and a spreader.

29. The system of claim 20 further comprising a second localization detection device on the second mobile machine configured to detect the defined path.

30. A mobile machine, comprising:
a receiver configured to receive control signals from a master mobile machine connected to the mobile machine by a tether line, wherein the control signals are adapted to control movement of the mobile machine to a position determined from an extension length of the tether line and an angle of the tether line; and
a controller coupled to the receiver and configured to control movement of the mobile machine in response to the control signals.

31. The mobile machine of claim 30, wherein the receiver is configured to receive the control signals transmitted wirelessly from the master mobile machine to the mobile machine.

32. The mobile machine of claim 30, wherein the receiver is configured to receive the control signals transmitted via the tether line from the master mobile machine to the mobile machine.

33. A method of controlling a mobile machine, comprising:
receiving first control signals from a master mobile machine connected by a tether line to the mobile machine, wherein the first control signals are adapted to control movement of the mobile machine through a first portion of a defined area relative to a first location of the master mobile machine;
receiving second control signals from the master mobile machine, wherein the second control signals are adapted to control movement of the mobile machine through a second portion of the defined area relative to a second location of the master mobile machine, wherein the controlled movement of the mobile machine is dependent upon the location of the master mobile machine but independent of a path taken by the master mobile machine between the first location and the second location; and
wherein the defined area is defined by a path of movement of the master mobile machine including the first location and the second location.

34. The method of claim 33, wherein receiving the first and second control signals from the master mobile machine includes receiving the first and second control signals wirelessly from the master mobile machine.

35. The method of claim 33, wherein receiving the first and second control signals from the master mobile machine includes receiving the first and second control signals via the tether line from the master mobile machine.

* * * * *